(12) United States Patent
Gangadharappa

(10) Patent No.: US 10,713,591 B2
(45) Date of Patent: Jul. 14, 2020

(54) ADAPTIVE METRIC PRUNING

(71) Applicant: AppDynamics LLC, San Francisco, CA (US)

(72) Inventor: Kiran Kuluvalli Gangadharappa, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 15/224,416

(22) Filed: Jul. 29, 2016

(65) Prior Publication Data

US 2018/0032906 A1    Feb. 1, 2018

(51) Int. Cl.
*G06N 20/00* (2019.01)
*G06Q 10/06* (2012.01)
*G06N 5/04* (2006.01)
*G06N 5/02* (2006.01)
*G06N 5/00* (2006.01)

(52) U.S. Cl.
CPC ............. *G06N 20/00* (2019.01); *G06N 5/025* (2013.01); *G06N 5/04* (2013.01); *G06Q 10/067* (2013.01); *G06N 5/00* (2013.01); *G06N 5/022* (2013.01)

(58) Field of Classification Search
CPC .......... G06N 20/00; G06N 5/00; G06N 5/022; G06N 5/025; G06Q 10/067

USPC .................................. 706/11, 46, 47, 48, 61
See application file for complete search history.

(56) References Cited

U.S. PATENT DOCUMENTS

| | | | |
|---|---|---|---|
| 2009/0300021 A1* | 12/2009 | Vasko | G05B 19/41845 |
| 2013/0238563 A1* | 9/2013 | Amarendran | G06F 16/21 |
| | | | 707/654 |
| 2014/0180738 A1* | 6/2014 | Phillipps | G06Q 10/0631 |
| | | | 705/7.12 |

\* cited by examiner

*Primary Examiner* — Shane D Woolwine
(74) *Attorney, Agent, or Firm* — Behmke Innovation Group LLC; James M. Behmke; James J. Wong

(57) ABSTRACT

A system for providing adaptive metric pruning includes a processor; a memory; and one or more modules stored in the memory and executable by a processor to perform operations including: receive, by a collector, metadata associated with the business transaction running in a monitored environment; train a machine learning system by providing training data and an anticipated result for the training data to the machine learning system to generate rules for retaining given metadata; predict a retention requirement for the received metadata by providing the received metadata to the machine learning system to apply the generated rules and generate a result for retaining the received metadata; and provide a user interface to display the generated result for retaining the received metadata including a recommendation on how to retain the received metadata according to the result for retaining the received metadata.

20 Claims, 8 Drawing Sheets

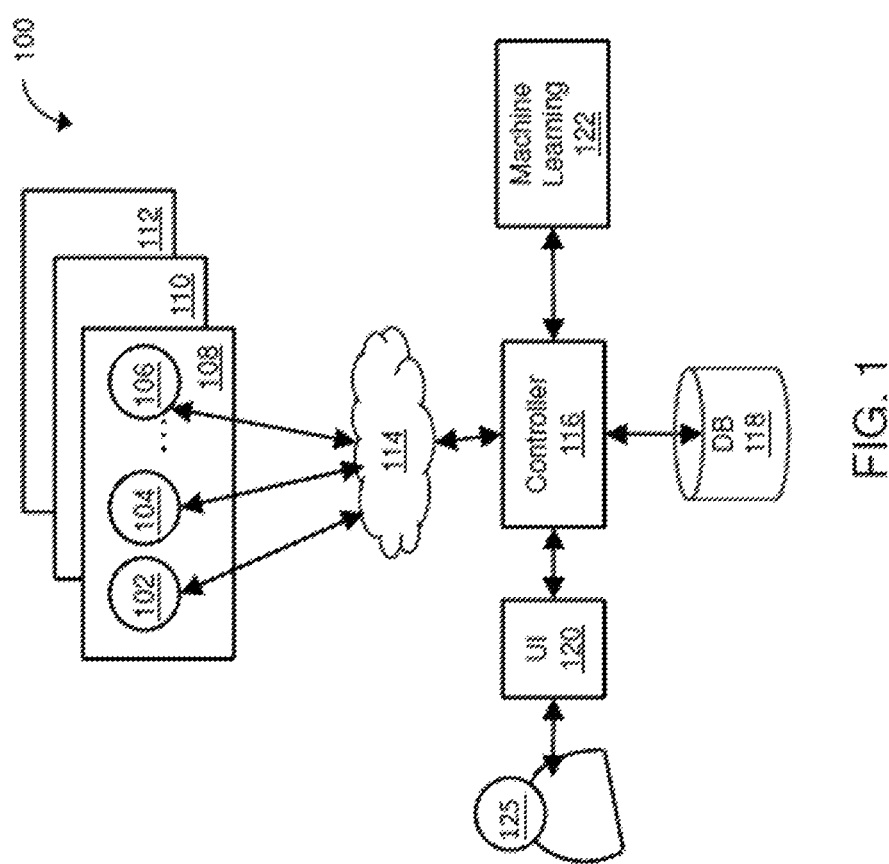

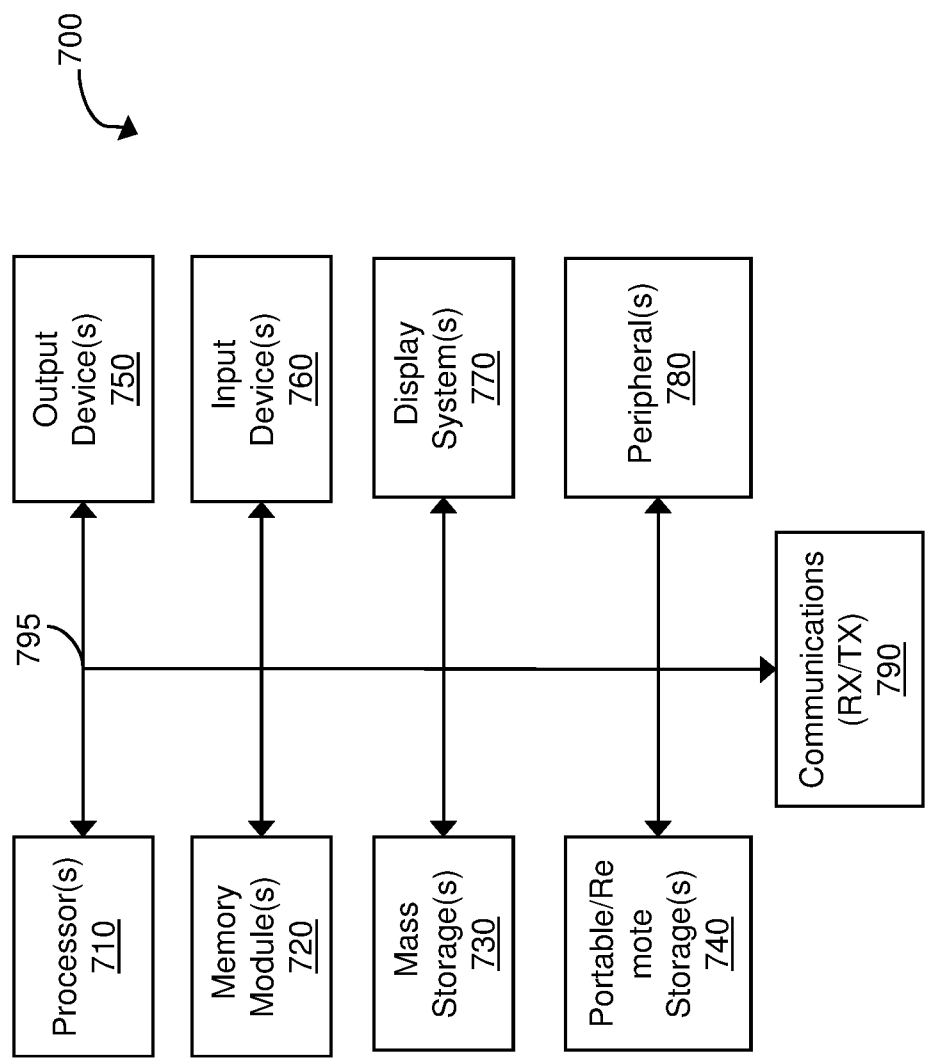

ADAPTIVE METRIC PRUNING

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of dynamic query chunking and streaming of results of the chunked queries are disclosed.

In one aspect, a system for providing adaptive metric pruning associated with a monitored business transaction is disclosed. The system includes a processor; a memory; and one or more modules stored in the memory and executable by a processor to perform operations including: receive, by a collector, metadata associated with the business transaction running in a monitored environment; train a machine learning system by providing training data and an anticipated result for the training data to the machine learning system to generate rules for retaining given metadata; predict a retention requirement for the received metadata by providing the received metadata to the machine learning system to apply the generated rules and generate a result for retaining the received metadata; and provide a user interface to display the generated result for retaining the received metadata including a recommendation on how to retain the received metadata according to the result for retaining the received metadata.

The system can be implemented in various ways to include one or more of the following features. For example, the one or more modules can be executable by a processor to train the machine learning system including applying a machine learning algorithm to the training data and the anticipated result to generate the rules for retaining the given metadata. The rules can include categorizing the given metadata into different groups having different retentions. The different groups having different retentions can include a group for removing from cache, a group for removing from disk, or a group for further monitoring. The one or more modules can be executable by a processor to predict the retention requirement including applying the machine learning algorithm to the received metadata to apply the generated rules to categorize the received metadata into the different groups. The one or more modules can be executable by a processor to provide feedback to the machine learning system to update the generated rules. The one or more modules can be executable by a processor to provide the feedback by adding the generated result for retaining the received metadata as new training data for the machine learning system. The metadata can include metric, events, logs, snapshots, or configurations. The metadata can be associated with monitored data including average response time, calls per minute, load, or number of slow calls.

In another aspect, a method for providing adaptive metric pruning associated with a monitored business transaction include receiving, by a collector, metadata associated with the business transaction running in a monitored environment; training a machine learning system by providing training data and an anticipated result for the training data to the machine learning system to generate rules for retaining given metadata; predicting a retention requirement for the received metadata by providing the received metadata to the machine learning system to apply the generated rules and generate a result for retaining the received metadata; and providing a user interface to display the generated result for retaining the received metadata including a recommendation on how to retain the received metadata according to the result for retaining the received metadata.

The method can be implemented in various ways to include one or more of the following features. For example, training the machine learning system can include applying a machine learning algorithm to the training data and the anticipated result to generate the rules for retaining the given metadata. The rules can include categorizing the given metadata into different groups having different retentions. The different groups having different retentions can include a group for removing from cache, a group for removing from disk, or a group for further monitoring. Predicting the retention requirement can include applying the machine learning algorithm to the received metadata to apply the generated rules to categorize the received metadata into the different groups. The method can include providing feedback to the machine learning system to update the generated rules. Providing the feedback can include adding the generated result for retaining the received metadata as new training data for the machine learning system.

In yet another aspect, a non-transitory computer readable medium embodying instructions when executed by a processor to cause operations to be performed is disclosed. The operations caused can include receiving, by a collector, metadata associated with the business transaction running in a monitored environment; training a machine learning system by providing training data and an anticipated result for the training data to the machine learning system to generate rules for retaining given metadata; predicting a retention requirement for the received metadata by providing the received metadata to the machine learning system to apply the generated rules and generate a result for retaining the received metadata; and providing a user interface to display the generated result for retaining the received metadata including a recommendation on how to retain the received metadata according to the result for retaining the received metadata.

The non-transitory computer readable medium can be implemented in various ways to include one or more of the following features. For example, the operations can include training the machine learning system including applying a machine learning algorithm to the training data and the anticipated result to generate the rules for retaining the given metadata. The rules can include categorizing the given metadata into different groups having different retentions. The different groups having different retentions can include a group for removing from cache, a group for removing from disk, or a group for further monitoring. Predicting the retention requirement can include applying the machine learning algorithm to the received metadata to apply the generated rules to categorize the received metadata into the different groups. The operations can include providing feedback to the machine learning system to update the generated rules. Providing the feedback can include adding the generated result for retaining the received metadata as new training data for the machine learning system.

BRIEF DESCRIPTION OF THE DRAWINGS

FIG. 1 is a block diagram showing an exemplary monitoring system for performing adaptive metric pruning.

FIG. 7 is a block diagram of an exemplary computing system implementing the disclosed technology.

DETAILED DESCRIPTION

Figure 2A:
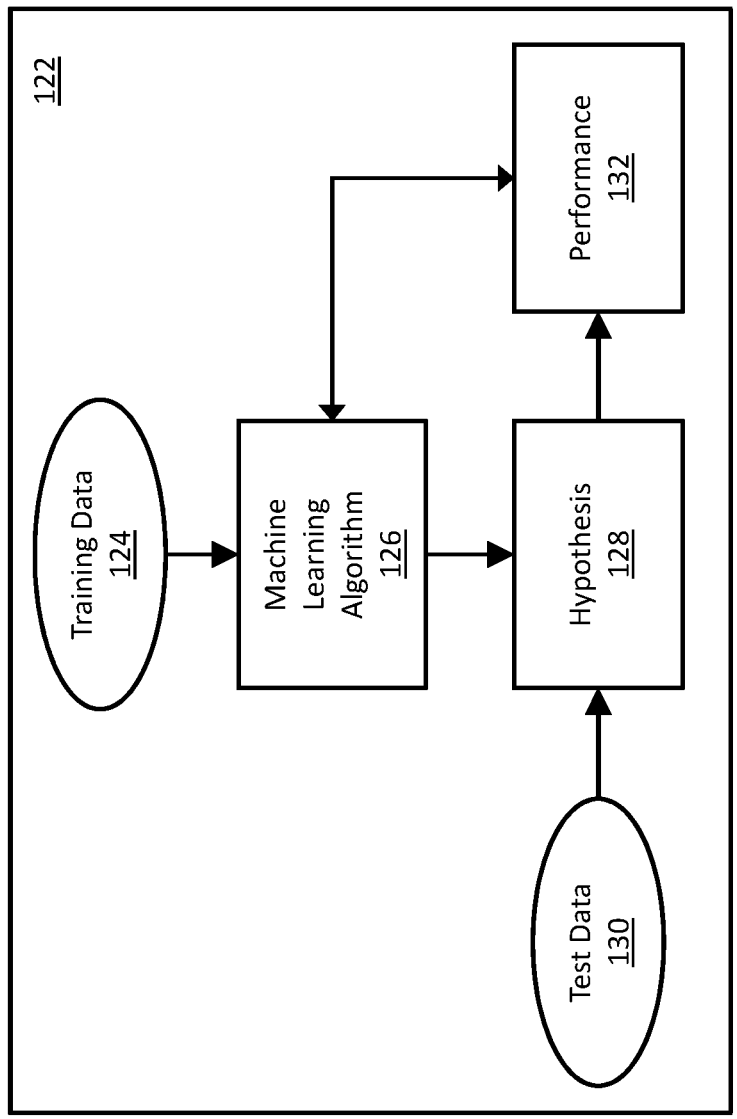
FIGS. 2A and 2B are block diagrams illustrating examples of the machine learning system.

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and user experience, each web application can be monitored to provide insight into information that can negatively affect the overall performance of the web application. For example, information including bottle necks in communication, communication failures and other information regarding performance of the services that provide the web application can be detected. When monitoring a network environment that includes business transactions running on multiple tiers of nodes, which include multiple machines running multiple processes, a large number (e.g., millions) of metadata are collected. Examples of metadata include metric such as average response time, CPU %, load, calls per minute, number of slow calls, and etc. Each metadata is associated with the actual data collected from the monitored environment for the corresponding metadata. In addition, for software as a service (SaaS) model, millions of the metadata are multiplied by the number of customers. In the end, the monitored data for a performance of a given business transaction can overwhelm the capacity of the monitoring system to store or cache the monitored data.

Adaptive Metric Pruning Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to adaptively prune metadata that represent performance related metric. As disclosed above, when the number of metadata collected increases due to the complex nature of business transaction monitoring and due to the increase in the number of customers supported in the SaaS model, the monitoring system can run out of storage and memory space for storing and caching metrics. Thus, when the collected metrics that are registered with the monitoring system exceed a preset limit, the monitoring system may need to be reset and reconfigured to add additional storage and memory. Such reset process can be disruptive to the monitoring process. The disclosed technology for adaptive metric pruning utilizes machine learning to predict which of the metrics can be safely deleted from memory or even never need to be saved in memory to reduce the storage burden.

Adaptive Metric Pruning System

FIG. 1 is a block diagram showing an exemplary monitoring system 100 for performing adaptive metric pruning. The monitoring system includes multiple (e.g., hundreds or thousands) of agents 102, 104, . . . 106 installed at customer machines where the applications to be monitored are also installed. For a SaaS model, each of multiple customers 108, 110, . . . 112 has multiple agents installed. Each agent collects two types of data: metadata and actual data for each metadata. Metadata includes metric such as average response time, CPU %, load, calls per minute, number of slow calls, and etc. The actual data for each metadata is the actual data behind the metadata collected by the agent. The proliferation of the number of customers and agents can quickly escalate the total number of metrics collected. The collected metrics (e.g., millions) are sent by the agents to a controller 116 installed at a cloud server over the internet 114. The controller stores the collected data in a data store, such as a database DB 118. The controller provides output of the collected data to a user 125 using a user interface 120. The user 125 can also provide input through the user interface 120 for the controller to process. For example, the user interface 120 can be used to receive user input requesting a report of the collected data, a query for the collected data, etc. The system also includes a machine learning system 122 for performing the disclosed adaptive metric pruning based on machine learning.

Figure 2B:
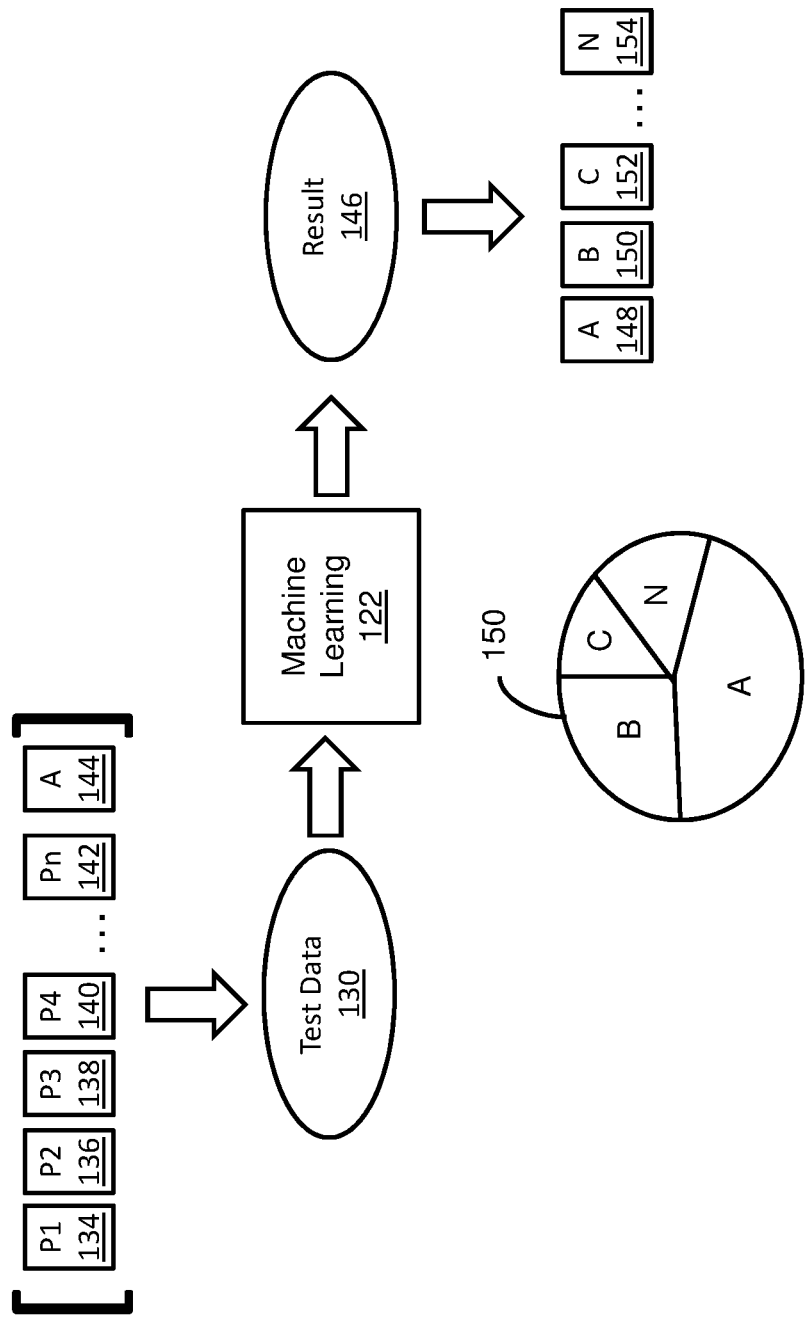

FIGS. 2A and 2B are block diagrams illustrating examples of the machine learning system 122. The machine learning system 122 can operate in two phases. The first phase is the training phase. During the training phase, training data 124 is provided to the machine learning algorithm 126. Examples of the machine learning algorithm can include the Weka collection. Weka is a collection of machine learning algorithms that includes tools for data pre-processing, classification, regression, clustering, association rules, and visualization. A hypothesis system 128 can apply the input received from the machine learning algorithm on test data 130 to generate predicted output performance results 132. The generated output performance results are fed back to the machine learning algorithm 126 to dynamically update the rules affecting the prediction. Thus, based on the test data, the machine learning algorithm 126 can continuously adjust the rules used to generate the prediction.

As shown in FIG. 2B, the test data 130 can include a number of parameters P1 (134), P2 (136), P3 (138), P4 (140) . . . Pn (142) and an anticipated outcome A (144) for the set of parameters. Each of the parameters can be given different weights or importance to influence the machine learning system. The machine learning system 122 uses the training as the starting point to develop an initial set of rules for predicatively classifying the test data into different categories, and as new test data is input into the machine learning algorithm, the rules are changes to affect the predictive classification. For example, the parameters considered can change if new parameters are added due to the new test data. Also, the weights applied for the parameters can change based on the new test data. The outcome or output of the machine learning system 122 includes classifying each metric from the test data into different categories or groups 148-154, including (A) remove from cache (148), (B) remove from disk (150), and (C) observer further (152). These are exemplary categories only and additional categories can be created based on the pruning desired. By applying machine learning, the monitoring system can reduce the metadata that need to be stored in memory. The disclosed machine learning is dynamic and can continue to fine tune the rules for reducing the metadata.

Different parameters P1 (134), P2 (136), P3 (138), P4 (140) . . . Pn (142) can be used as a part of the machine learning rule. Examples of parameters can include, the source of the metadata, age of the metadata, size of the metadata (how much memory is used), last time the metadata was read, last time the metadata was written, last time the metadata was reported, when was the metadata registered, health rules for the metadata, whether the metadata is dynamic, whether the metadata is related to a test application, whether the metadata has an improper name, whether the metadata is a custom metadata, whether the metadata is a JVM specific metadata, etc. Different weights can be applied to each parameter based on the pruning desired initially, and the weights can vary over time as the test data changes. For example, if the age of the metadata is longer than 1 year and the metadata has not been read during that time, the weights of the age and last time read parameters can be increased.

After the test metadata are fed through the machine learning model, the controller can display the results of the machine learning processing. The results reported to the user through the user interface can include recommendations to the user, such as providing a list of metadata that can be deleted and reasons for recommending the deletion of those metadata.

Figure 3A:
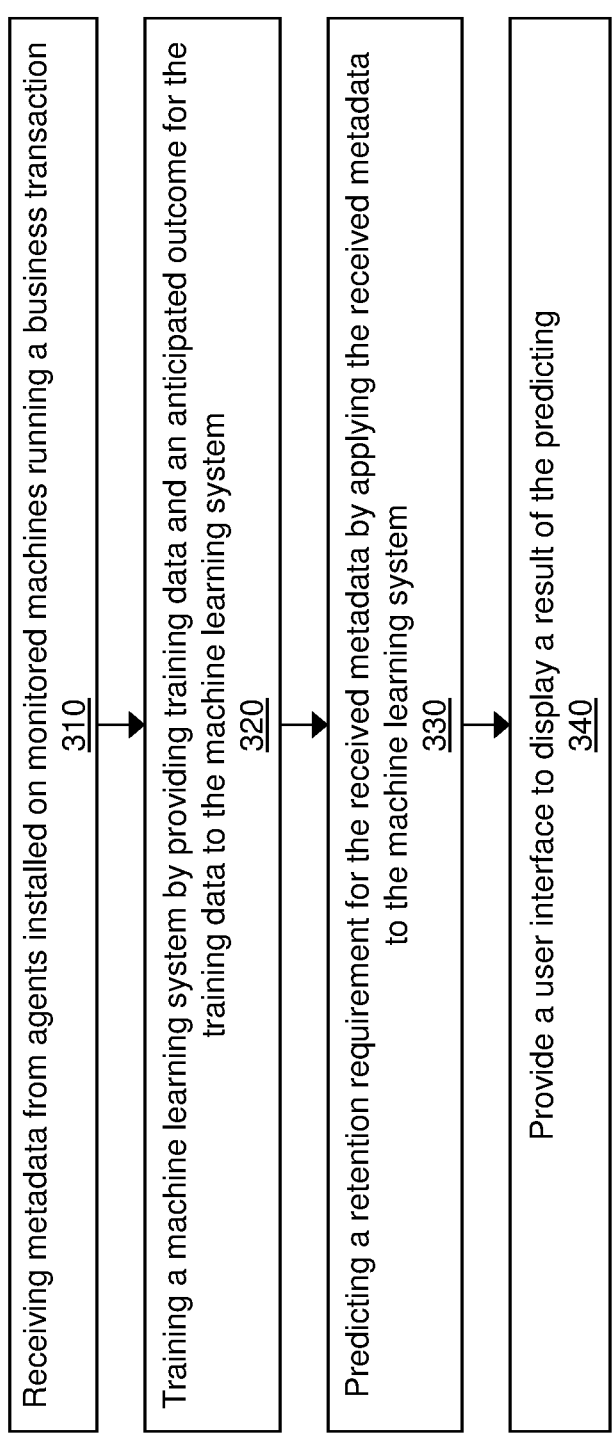
FIGS. 3A and 3B are process flow diagrams of an exemplary method for performing adaptive metric pruning using machine learning.
Figure 3B:
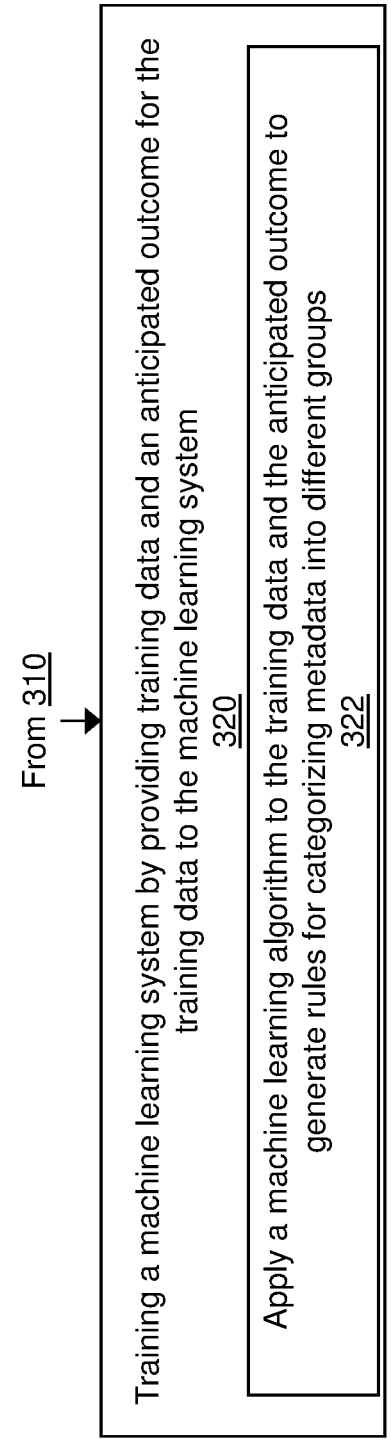

FIGS. 3A and 3B are process flow diagrams of an exemplary method 300 for performing adaptive metric pruning using machine learning. The method 300 can include receiving metadata from agents installed on monitored machines running a business transaction being monitored for performance (310). The method includes training a machine learning system (e.g., machine learning system 122 of FIGS. 1, 2A and 2B) by applying training data and an anticipated outcome for the training data to the machine learning system (320). The training data can be substantially similar to those described with respect to FIGS. 1, 2A and 2B. The method includes predicting a retention requirement for the received metadata by applying the received metadata to the machine learning system (330). The method includes providing a user interface (e.g., a dashboard) to display a result of the predicting process (340). Displaying the results can include a recommendation on how to store the received metadata.

As shown in FIG. 3B, training the machine learning system (process 320) can include applying a machine learning algorithm (see above description related to FIGS. 1, 2A and 2B for examples of algorithms) to the training data and the anticipated outcome to generate rules for categorizing metadata into different groups (322). As described above with respect to FIGS. 1, 2A and 2B, different groups 148-154 can include (A) remove from cache (148), (B) remove from disk (150), and (C) observer further (152). Those categorized into group A can be removed from cache, those categorized into group B can be removed from disk and those categorized into group C can be retained as-is for further observation before deciding whether to remove the metadata from cache or memory.

Figure 4:
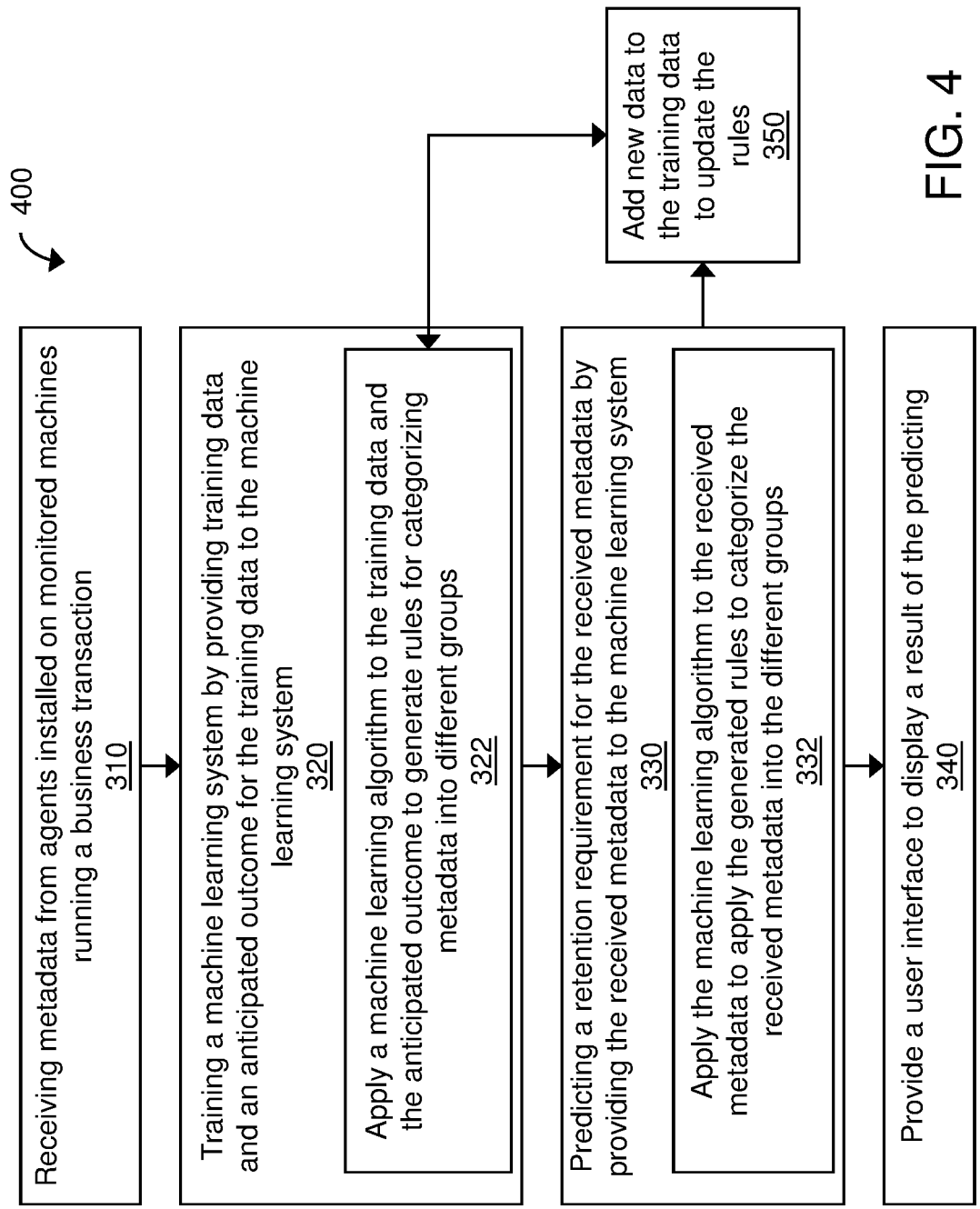
FIG. 4 is a process flow diagram of another exemplary method for performing adaptive metric pruning using machine learning according to the disclosed technology.

FIG. 4 is a process flow diagram of another exemplary method 400 for performing adaptive metric pruning using machine learning according to the disclosed technology. The method 400 is substantially similar to the process 300 described with respect to FIGS. 3A and 3B but includes processes for updating the machine learning process. For example, similar to process 300, the process 400 includes receiving metadata from agents installed on monitored machines running a business transaction being monitored for performance (310). The method 400 includes training a machine learning system (e.g., machine learning system 122 of FIGS. 1, 2A and 2B) by applying training data and an anticipated outcome for the training data to the machine learning system (320). The training data can be substantially similar to those described with respect to FIGS. 1, 2A and 2B. Training the machine learning system (process 320) can include applying a machine learning algorithm (see above description related to FIGS. 1, 2A and 2B for examples of algorithms) to the training data and the anticipated outcome to generate rules for categorizing metadata into different groups (322). As described above with respect to FIGS. 1, 2A and 2B, different groups can include (A) remove from cache (148), (B) remove from disk (150), and (C) observer further (152). Those categorized into group A can be removed from cache, those categorized into group B can be removed from disk and those categorized into group C can be retained as-is for further observation before deciding whether to remove the metadata from cache or memory.

The method 400 includes predicting a retention requirement for the received metadata by applying the received metadata to the machine learning system (330). Predicting the retention requirement (process 330) can include applying the machine learning algorithm to the received metadata to apply the generated rules to categorize the received metadata into the different groups, such as groups A, B, and C (332). The received metadata processed by machine learning system can be added as new data to the train the machine learning system an update the rules (350). Thus, each time the received metadata (newly received from the agents) are processed by the machine learning system, the newly received metadata are provided as feedback to the machine learning system and used to further train the machine learning system.

Similar to method 300, the method 400 includes providing a user interface (e.g., a dashboard) to display a result of the predicting process (340). Displaying the results can include a recommendation on how to store the received metadata. For example, the meta data groups A, B, and C can be displayed to the user through the user interface along with recommendations on how to deal with the groups A, B, and C. For example, a 'delete from cache' button can be provided next to group A to enable the user to delete the metadata in group A from cache. Similarly, a 'delete from disk' button can be provided next to group B to enable the user to delete the metadata in group B from disk.

In some implementations, the user interface can include functions for the user to provide feedback to the machine learning system. For example, the user can provide additional rules, change the rules, provide additional training data and anticipated outcome, etc.

In some implementations, the machine learning system can process the metric data in other ways in addition to or rather than classifying the metrics into probabilistic distributions as described above. In one aspect, the machine learning system can automatically purge metric data based on a threshold. For example, if the metric group for deleting from disk is at 0.8, the system can automatically delete etc. In another aspect, the user can set a condition or rule for removing a given metric from memory or storage.

Application Intelligence Platform Architecture

Figure 5:
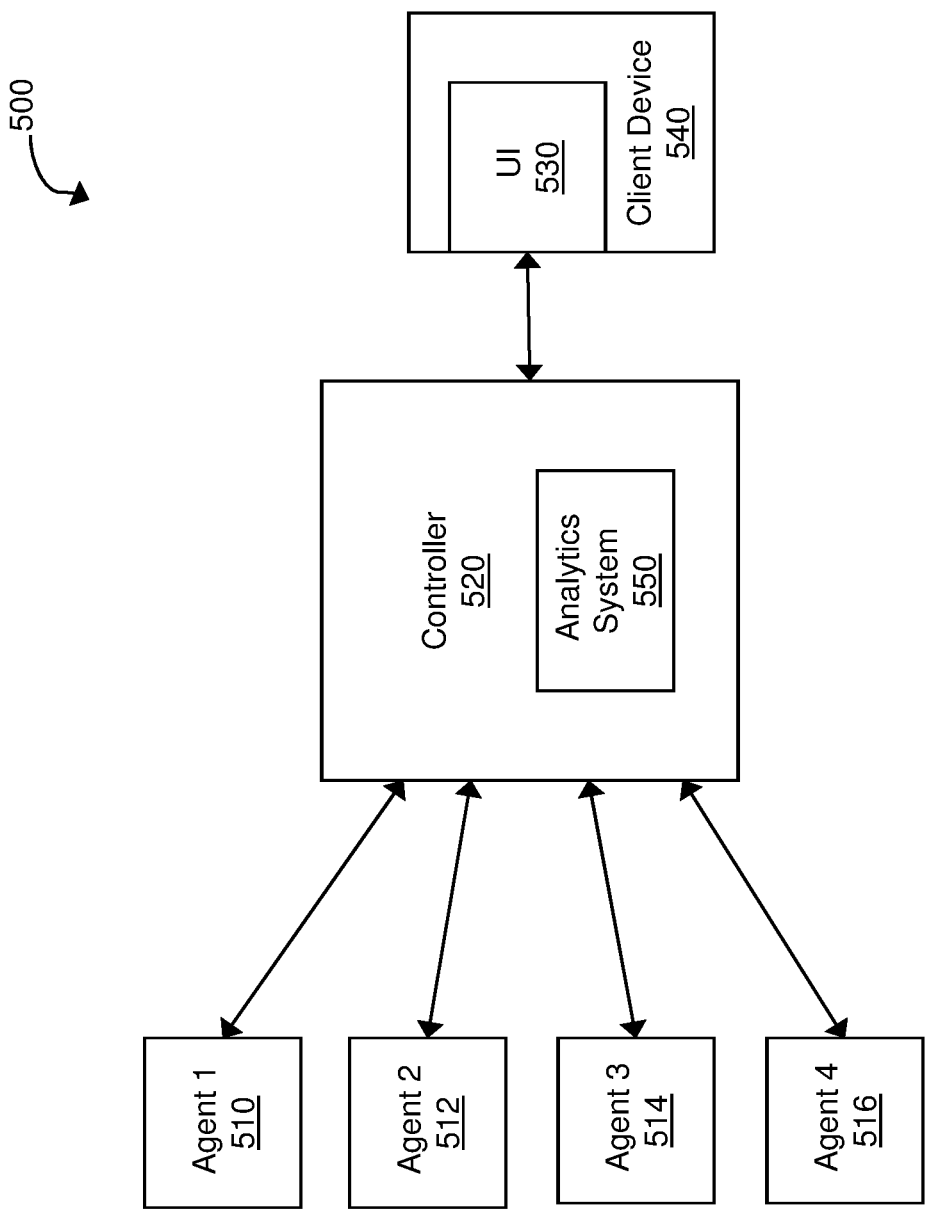
FIG. 5 is a block diagram of an exemplary application intelligence platform that can adaptive metric pruning as disclosed in this patent document.

FIG. 5 is a block diagram of an exemplary application intelligence platform 500 that can implement the adaptive metric pruning as disclosed in this patent document. The application intelligence platform is a system that monitors and collect metrics of performance data for an application environment being monitored. At the simplest structure, the application intelligence platform includes one or more agents 510, 512, 514, 516 and one or more controllers 520. While FIG. 5 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 520 is the central processing and administration server for the application intelligence platform. The controller 520 serves a browser-based user interface (UI) 530 that is the primary interface for monitoring, analyzing, and troubleshooting the monitored environment. The controller 520 can control and manage monitoring of business transactions distributed over application servers. Specifically, the controller 520 can receive runtime data from agents 510, 512, 514, 516 and coordinators, associate portions of business transaction data, communicate with agents to configure collection of runtime data, and provide performance data and reporting through the interface 530. The interface 530 may be viewed as a web-based interface viewable by a client device 540. In some implementations, a client device 540 can directly communicate with controller 520 to view an interface for monitoring data.

In the Software as a Service (SaaS) implementation, a controller instance 520 is hosted remotely by a provider of the application intelligence platform 500. In the on-premise (On-Prem) implementation, a controller instance 520 is installed locally and self-administered.

The controllers 520 receive data from different agents 510, 512, 514, 516 deployed to monitor applications, databases and database servers, servers, and end user clients for the monitored environment. Any of the agents 510, 512, 514, 516 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 520 can include an analysis system 550 for provide the adaptive metric pruning as disclosed in this patent document. In some implementations, the analytics system 550 can be implemented in a separate machine (e.g., a server) different from the one hosting the controller 520.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model, The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of air average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application point in time. Snapshots usually include call graphs that allow that enables drilling down to the line of code that may be causing performance problems. The most common snapshots are transaction snapshots.

Exemplary Implementation of Application Intelligence Platform

Figure 6:
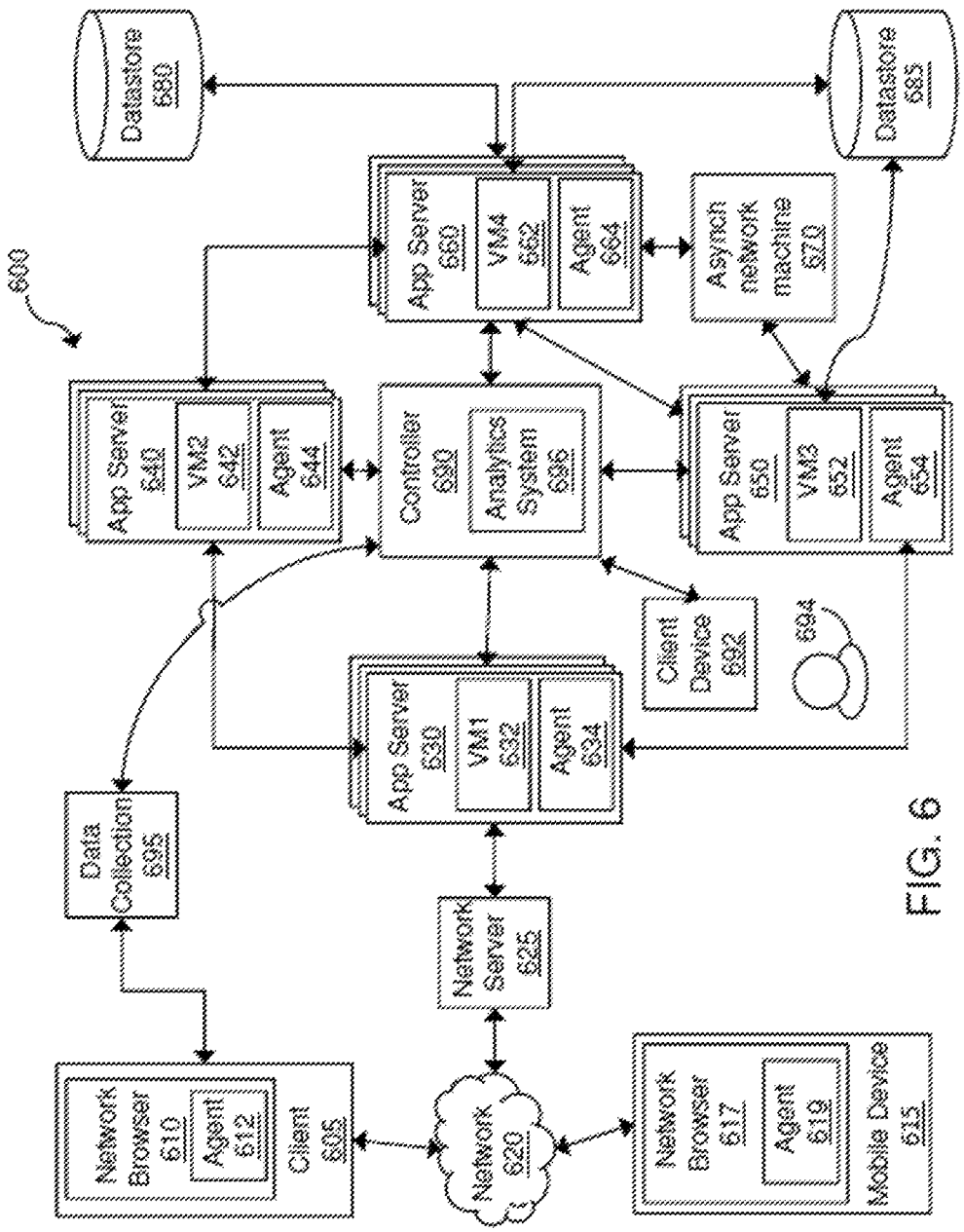
FIG. 6 is a block diagram of an exemplary system for providing adaptive metric pruning as disclosed in this patent document, including the processes disclosed with respect to FIGS. 1-5.

FIG. 6 is a block diagram of an exemplary system 600 for providing adaptive metric pruning as disclosed in this patent document, including the processes disclosed with respect to FIGS. 1-5. The system 600 in FIG. 6 includes client device 605 and 692 that may be operated by a user 694, mobile device 615, network 620, network server 625, application servers 630, 640, 650 and 660, asynchronous network machine 670, data stores 680 and 685, controller 690, and data collection server 695. The controller 690 can include an analysis system 696 for providing adaptive metric pruning as disclosed in this patent document. In some implementations, the analysis system 696 can be implemented in a separate machine (e.g., a server) different from the one hosting the controller 690.

Client device 605 may include network browser 610 and be implemented as a computing device, such as for example a laptop, desktop, workstation, or some other computing device. Network browser 610 may be a client application for viewing content provided by an application server, such as application server 630 via network server 625 over network 620.

Network browser 610 may include agent 612. Agent 612 may be installed on network browser 610 and/or client 605 as a network browser add-on, downloading the application to the server, or in some other manner. Agent 612 may be executed to monitor network browser 610, the operating system of client 605, and any other application, API, or other component of client 605. Agent 612 may determine network browser navigation timing metrics, access browser cookies, monitor code, and transmit data to data collection server 695, controller 690, or another device. Agent 612 may perform other operations related to monitoring a request or a network at client 605 as discussed herein.

Mobile device 615 is connected to network 620 and may be implemented as a portable device suitable for sending and receiving content over a network, such as for example a mobile phone, smart phone, tablet computer, or other portable device. Both client device 605 and mobile device 615 may include hardware and/or software configured to access a web service provided by network server 625.

Mobile device 615 may include network browser 617 and an agent 619. Mobile device may also include client applications and other code that may be monitored by agent 619.

Agent 619 may reside in and/or communicate with network browser 617, as well as communicate with other applications, an operating system, APIs and other hardware and software on mobile device 615. Agent 619 may have similar functionality as that described herein for agent 612 on client 605, and may repot data to data collection server 695 and/or controller 690.

Network 620 may facilitate communication of data among different servers, devices and machines of system 600 (some connections shown with lines to network 620, some not shown). The network may be implemented as a private network, public network, intranet, the Internet, a cellular network, Wi-Fi network, VoIP network, or a combination of one or more of these networks. The network 620 may include one or more machines such as load balance machines and other machines.

Network server 625 is connected to network 620 and may receive and process requests received over network 620. Network server 625 may be implemented as one or more servers implementing a network service, and may be implemented on the same machine as application server 630 or one or more separate machines. When network 620 is the Internet, network server 625 may be implemented as a web server.

Application server 630 communicates with network server 625, application servers 640 and 650, and controller 690. Application server 650 may also communicate with other machines and devices (not illustrated in FIG. 6). Application server 630 may host an application or portions of a distributed application. The host application 632 may be in one of many platforms, such as including a Java, PHP, .Net, and Node.JS, be implemented as a Java virtual machine, or include some other host type. Application server 630 may also include one or more agents 634 (i.e. "modules"), including a language agent, machine agent, and network agent, and other software modules. Application server 630 may be implemented as one server or multiple servers as illustrated in FIG. 6.

Application 632 and other software on application server 630 may be instrumented using byte code insertion, or byte code instrumentation (BCI), to modify the object code of the application or other software. The instrumented object code may include code used to detect calls received by application 632, calls sent by application 632, and communicate with agent 634 during execution of the application. BCI may also be used to monitor one or more sockets of the application and/or application server in order to monitor the socket and capture packets coming over the socket.

In some embodiments, server 630 may include applications and/or code other than a virtual machine. For example, servers 630, 640, 650, and 660 may each include Java code, .Net code, PHP code, Ruby code, C code, C++ or other binary code to implement applications and process requests received from a remote source. References to a virtual machine with respect to an application server are intended to be for exemplary purposes only.

Agents 634 on application server 630 may be installed, downloaded, embedded, or otherwise provided on application server 630. For example, agents 634 may be provided in server 630 by instrumentation of object code, downloading the agents to the server, or in some other manner. Agent 634 may be executed to monitor application server 630, monitor code running in a virtual machine 632 (or other program language, such as a PHP, .Net, or C program), machine resources, network layer data, and communicate with byte instrumented code on application server 630 and one or more applications on application server 630.

Each of agents 634, 644, 654 and 664 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 634 may detect operations such as receiving calls and sending requests by application server 630, resource usage, and incoming packets. Agent 634 may receive data, process the data, for example by aggregating data into metrics, and transmit the data and/or metrics to controller 690. Agent 634 may perform other operations related to monitoring applications and application server 630 as discussed herein. For example, agent 634 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 690 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 634 may create a request identifier for a request received by server 630 (for example, a request received by a client 605 or 615 associated with a user or another source). The request identifier may be sent to client 605 or mobile device 615, whichever device sent the request. In embodiments, the request identifier may be created when a data is collected and analyzed for a particular business transaction.

Each of application servers 640, 650 and 660 may include an application and agents. Each application may run on the corresponding application server. Each of applications 642, 652 and 662 on application servers 640-660 may operate similarly to application 632 and perform at least a portion of a distributed business transaction. Agents 644, 654 and 664 may monitor applications 642-662, collect and process data at runtime, and communicate with controller 690. The applications 632, 642, 652 and 662 may communicate with each other as part of performing a distributed transaction. In particular, each application may call any application or method of another virtual machine.

Asynchronous network machine 670 may engage in asynchronous communications with one or more application servers, such as application server 650 and 660. For example, application server 650 may transmit several calls or messages to an asynchronous network machine. Rather than communicate back to application server 650, the asynchronous network machine may process the messages and eventually provide a response, such as a processed message, to application server 660. Because there is no return message from the asynchronous network machine to application server 650, the communications among them are asynchronous.

Data stores 680 and 685 may each be accessed by application servers such as application server 650. Data store 685 may also be accessed by application server 650. Each of data stores 680 and 685 may store data, process data, and return queries received from an application server. Each of data stores 680 and 685 may or may not include an agent.

Controller 690 may control and manage monitoring of business transactions distributed over application servers 630-660. In some embodiments, controller 690 may receive application data, including data associated with monitoring client requests at client 605 and mobile device 615, from data collection server 660. In some embodiments, controller 690 may receive application monitoring data and network data from each of agents 612, 619, 634, 644 and 654. Controller 690 may associate portions of business transaction data, communicate with agents to configure collection of data, and provide performance data and reporting through an interface. The interface may be viewed as a web-based interface viewable by client device 692, which may be a mobile device, client device, or any other platform for viewing an interface provided by controller 690. In some embodiments, a client device 692 may directly communicate with controller 690 to view an interface for monitoring data.

Client device 692 may include any computing device, including a mobile device or a client computer such as a desktop, work station or other computing device. Client computer 692 may communicate with controller 690 to create and view a custom interface. In some embodiments, controller 690 provides an interface for creating and viewing the custom interface as a content page, e.g., a web page, which may be provided to and rendered through a network browser application on client device 692.

Applications 632, 642, 652 and 662 may be any of several types of applications. Examples of applications that may implement applications 632-662 include a Java, PHP, .Net, Node.JS, and other applications.

FIG. 22 is a block diagram of a computer system 2200 for implementing the present technology. System 2200 of FIG. 22 may be implemented in the contexts of the likes of clients 605, 692, network server 625, servers 630, 640, 650, 660, a synchronous network machine 670 and controller 690.

FIG. 72 is a block diagram of a computer system 700 for implementing the present technology. System 700 of FIG. 7 may be implemented in the contexts of the likes of clients 605, 692, network server 625, servers 630, 640, 650, 660, a synchronous network machine 670 and controller 690.

The components shown in FIG. 7 are depicted as being connected via a single bus 795. However, the components may be connected through one or more data transport means. For example, processor unit 710 and main memory 720 may be connected via a local microprocessor bus, and the mass storage device 730, peripheral device(s) 780, portable or remote storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 620.

Portable storage device 740 operates in conjunction with a portable non-volatile storage medium, such as a compact disk, digital video disk, magnetic disk, flash storage, etc. to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 700 of FIG. 7 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for providing adaptive metric pruning associated with a monitored business transaction running on multiple tiers of nodes and distributed components in a monitored environment, including:
    a processor;
    a memory; and
    one or more modules stored in the memory and executable by the processor to perform operations including:
        receive, by a collector, metadata associated with the monitored business transaction, wherein the monitored business transaction is created by detecting an incoming request at an entry point of the monitored environment and tracking activity associated with the incoming request from an originating tier of the multiple tiers to one or more distributed components of the monitored environment, further wherein the metadata is gathered by a plurality of agents executing on devices of an end-to-end processing path used to fulfill a service request for the monitored business transaction in the monitored environment;
        train a machine learning system by providing training data and an anticipated result for the training data to the machine learning system to generate rules for retaining previously received metadata;
        predict a retention requirement for the received metadata by providing the received metadata to the machine learning system to apply the generated rules and generate a result for retaining the received metadata, wherein different weights are applied to parameters of the received metadata; and
        provide a user interface to display the generated result for retaining the received metadata including a recommendation on how to retain the received metadata according to the result for retaining the received metadata.

2. The system of claim 1, wherein the one or more modules are executable by the processor to train the machine learning system including applying a machine learning algorithm to the training data and the anticipated result to generate the rules for retaining the previously received metadata, wherein the rules include categorizing the previously received metadata into different groups having different retentions.

3. The system of claim 2, wherein the different groups having different retentions include a group for removing from cache, a group for removing from disk, or a group for further monitoring.

4. The system of claim 2, wherein the one or more modules are executable by the processor to predict the retention requirement including applying the machine learning algorithm to the received metadata to apply the generated rules to categorize the received metadata into the different groups.

5. The system of claim 4, wherein the one or more modules are executable by the processor to provide feedback to the machine learning system to update the generated rules.

6. The system of claim 5, wherein the one or more modules are executable by the processor to provide the feedback by adding the generated result for retaining the received metadata as new training data for the machine learning system.

7. The system of claim 1, wherein the metadata includes metrics, events, logs, snapshots, or configurations.

8. The system of claim 7, wherein the metadata are associated with monitored data including average response time, calls per minute, load, or number of slow calls.

9. A method for providing adaptive metric pruning associated with a monitored business transaction running on multiple tiers of nodes and distributed components in a monitored environment, including:
    receiving, by a collector, metadata associated with the monitored business transaction, wherein the monitored business transaction is created by detecting an incoming request at an entry point of the monitored environment and tracking activity associated with the incoming request from an originating tier of the multiple tiers to one or more distributed components of the monitored environment, further wherein the metadata is gathered by a plurality of agents executing on devices of an end-to-end processing path used to fulfill a service request for the monitored business transaction in the monitored environment;
    training a machine learning system by providing training data and an anticipated result for the training data to the machine learning system to generate rules for retaining previously received metadata;
    predicting a retention requirement for the received metadata by providing the received metadata to the machine learning system to apply the generated rules and generate a result for retaining the received metadata, wherein different weights are applied to parameters of the received metadata; and
    providing a user interface to display the generated result for retaining the received metadata including a recommendation on how to retain the received metadata according to the result for retaining the received metadata.

10. The method of claim 9, wherein training the machine learning system includes applying a machine learning algorithm to the training data and the anticipated result to generate the rules for retaining the previously received metadata, wherein the rules include categorizing the previously received metadata into different groups having different retentions.

11. The method of claim 10, wherein the different groups having different retentions include a group for removing from cache, a group for removing from disk, or a group for further monitoring.

12. The method of claim 10, wherein predicting the retention requirement includes applying the machine learning algorithm to the received metadata to apply the generated rules to categorize the received metadata into the different groups.

13. The method of claim 12, including providing feedback to the machine learning system to update the generated rules.

14. The method of claim 13, wherein providing the feedback includes adding the generated result for retaining the received metadata as new training data for the machine learning system.

15. A non-transitory computer readable medium embodying instructions for providing adaptive metric pruning associated with a monitored business transaction running on multiple tiers of nodes and distributed components in a monitored environment, that, when executed by a processor, cause operations to be performed including:
   receiving, by a collector, metadata associated with a business transaction, wherein the monitored business transaction is created by detecting an incoming request at an entry point of the monitored environment and tracking activity associated with the incoming request from an originating tier of the multiple tiers to one or more distributed components of the monitored environment, further wherein the metadata is gathered by a plurality of agents executing on devices of an end-to-end processing path used to fulfill a service request for the monitored business transaction in the monitored environment;
   training a machine learning system by providing training data and an anticipated result for the training data to the machine learning system to generate rules for retaining previously received metadata;
   predicting a retention requirement for the received metadata by providing the received metadata to the machine learning system to apply the generated rules and generate a result for retaining the received metadata, wherein different weights are applied to parameters of the received metadata; and
   providing a user interface to display the generated result for retaining the received metadata including a recommendation on how to retain the received metadata according to the result for retaining the received metadata.

16. The non-transitory computer readable medium of claim 15, wherein the operations include training the machine learning system including applying a machine learning algorithm to the training data and the anticipated result to generate the rules for retaining the previously received metadata, wherein the rules include categorizing the previously received metadata into different groups having different retentions.

17. The non-transitory computer readable medium of claim 16, wherein the different groups having different retentions include a group for removing from cache, a group for removing from disk, or a group for further monitoring.

18. The non-transitory computer readable medium of claim 16, wherein predicting the retention requirement includes applying the machine learning algorithm to the received metadata to apply the generated rules to categorize the received metadata into the different groups.

19. The non-transitory computer readable medium of claim 18, wherein the operations include providing feedback to the machine learning system to update the generated rules.

20. The non-transitory computer readable medium of claim 19, wherein providing the feedback includes adding the generated result for retaining the received metadata as new training data for the machine learning system.

* * * * *

UNITED STATES PATENT AND TRADEMARK OFFICE
CERTIFICATE OF CORRECTION

PATENT NO. : 10,713,591 B2
APPLICATION NO. : 15/224416
DATED : July 14, 2020
INVENTOR(S) : Kiran Kuluvalli Gangadharappa It is certified that error appears in the above-identified patent and that said Letters Patent is hereby corrected as shown below:

In the Specification

Column 4, Line 66, please amend as shown:
of rules for predictively classifying the test data into Column 11, Line 22, please amend as shown:
warning condition as the combination of an average Column 11, Line 66, please amend as shown:
tion at a certain point in time. Snapshots usually include call graphs that Column 15, please delete Lines 58-62

Column 15, Line 63, please amend as shown:
FIG. 7 is a block diagram of a computer system 700 for Signed and Sealed this
Tenth Day of November, 2020

Andrei Iancu
*Director of the United States Patent and Trademark Office*